United States Patent
Itabashi

(10) Patent No.: US 6,909,256 B2
(45) Date of Patent: Jun. 21, 2005

(54) CONTROL DEVICE OF A POSITION CONTROL MOTOR

(75) Inventor: Masanari Itabashi, Kashiwa (JP)

(73) Assignee: Oriental Motor Co., Ltd. (JP)

( * ) Notice: Subject to any disclaimer, the term of this patent is extended or adjusted under 35 U.S.C. 154(b) by 0 days.

(21) Appl. No.: 10/828,809

(22) Filed: Apr. 20, 2004

(65) Prior Publication Data

US 2004/0212340 A1 Oct. 28, 2004

(30) Foreign Application Priority Data

Apr. 22, 2003 (JP) ........................................ 2003-116420

(51) Int. Cl.[7] .............................................. G05B 19/40
(52) U.S. Cl. ....................... 318/685; 318/696; 318/254; 318/652; 318/671
(58) Field of Search ................................ 318/685, 696, 318/254, 138, 439, 652, 671

(56) References Cited

U.S. PATENT DOCUMENTS

| | | | | |
|---|---|---|---|---|
| 5,321,342 A | * | 6/1994 | Kruse | 318/254 |
| 5,569,990 A | * | 10/1996 | Dunfield | 318/254 |
| 5,874,821 A | * | 2/1999 | Monleone | 318/600 |
| 6,034,499 A | * | 3/2000 | Tranovich | 318/650 |
| 6,121,744 A | * | 9/2000 | Hoda et al. | 318/685 |
| 6,144,120 A | * | 11/2000 | Doi et al. | 310/49 R |
| 6,157,150 A | * | 12/2000 | Konecny | 318/254 |
| 6,462,492 B1 | * | 10/2002 | Sakamoto et al. | 318/254 |
| 6,555,985 B1 | * | 4/2003 | Kawabata et al. | 318/685 |
| 6,747,433 B2 | * | 6/2004 | Kuwano et al. | 318/685 |

FOREIGN PATENT DOCUMENTS

| | | |
|---|---|---|
| JP | 62-230399 | 10/1987 |
| JP | 11-113289 | 4/1999 |

* cited by examiner

*Primary Examiner*—Rina Duda
(74) *Attorney, Agent, or Firm*—Anderson Kill & Olick, PC

(57) ABSTRACT

The present invention provides a control device of a position control motor for preventing step out of the position control motor, wherein the heat generated by the position control motor is small and the energy efficiency is good. The device is constituted by a detection portion 2 detecting the rotor position of a position control motor 1, first and second control portions 3 and 4 outputting signals corresponding to a current to be supplied to the motor winding based on the deviation between the position detection signal and a command position signal, first and second distribution adjusting portions 5 and 6 distributing the output signals of the first and second control portions 3 and 4, a signal synthesis portion 7 synthesizing by vector addition the output signals distributed by the first and second distribution adjusting portions 5 and 6, and an amplification portion 8 outputting the synthesized output signal to the motor winding, and the device controls the position of the motor with the command position signal. The first control portion 3 monitors the deviation between the command position and the rotor position that is detected, and based on the amount of this deviation (electrical angle), switches to one of two modes, preventing step down.

2 Claims, 6 Drawing Sheets

CONTROL DEVICE OF A POSITION CONTROL MOTOR

FIELD OF THE INVENTION AND RELATED ART STATEMENT

The present invention relates to a control device for a position control motor such as brushless motors and stepping motors, and more particularly relates to a control device for a position control motor that increases and decreases the current flowing to the motor winding of the position control motor in accordance with the load torque acting on that position control motor.

Conventionally, how to prevent step out of the motor was a very important issue in the control of such brushless motors and stepping motors. The principle of step out is discussed later.

As regards a control device of a stepping motor having a function for preventing this step out, there is for example the invention of a drive control for preventing step out of a stepping motor that has already been proposed by the inventors of the present application, and at the time that this proposal was made it was extremely effective. At present it has become increasingly less practical (see Japanese Patent No. 2562874, for example).

The principle of the problem of step out in brushless motors and stepping motors is described here.

FIG. 9 shows the basic characteristics of a stepping motor. When the rotor is displaced while the phase exciting the stator is at 0°, then a torque (vertical axis) corresponding to the rotation angle is generated in the stepping motor. The torque forms a sine wave every given number of teeth formed in the rotor, for a single turn of the machine rotation angle. This is known as the θ-T characteristics. Hereinafter, an example is described in which with the number of teeth of the rotor is 50.

As can be understood from FIG. 9, near 0° with respect to the excitation angle, the torque generated in a stepping motor as a counter-force is proportional to the angle by which the rotor is moved by an external force. The stepping motor performs position control by the rotor moving in a synchronized manner when the command position is set to the excitation angle.

However, when the rotation angle exceeds ±1.8° (±90° electrical angle), the problem of step down, in which torque that is generated is reduced or inverted, occurs. In this case, the rotor stops at a different angle that than of the command position.

FIG. 10 shows the θ-T characteristics in a case where control to inhibit step down is performed by adding a control circuit to a stepping motor having the above θ-T characteristics. This control circuit changes the excitation angle in accordance with the rotor, thus maintaining a maximum torque. This control method is disclosed in Japanese Patent Provisional Publication No. 1999-113289.

In this control method, a control device monitors the deviation between the command position signal and the rotor position signal that is detected, provides the following two modes depending on that deviation amount (electrical angle), and switches to one of the modes depending on the deviation amount. That is, as shown in FIG. 10, from the relationship between the rotor position (rotation angle) and the torque that is generated in the rotor, (a) if −90°≦deviation amount≦+90°, then the mode is set to the ST mode (stepping motor mode), switching the excitation state of the motor winding; and (b) if −90°>deviation amount or +90°<deviation amount, then the mode is set to the BL mode (brushless motor mode), causing excitation such that the phase of the excitation current becomes a stable excitation point 90° ahead of the rotor position.

Consequently, with this control method, if the rotation angle is greater than ±1.8°, then a maximum torque of the stepping motor is maintained by the control circuit changing the excitation angle in conjunction with the rotation angle of the rotor. That is, within ±1.8°, the excitation angle is the command position, and if greater than ±1.8°, then the excitation angle is set to the excitation phase where a maximum torque is applied in accordance with the rotor angle.

However, the invention disclosed in Japanese Patent Provisional Publication No. 1999-113289 as a technique for prevention of motor step down has the problem that the amount of heat generated by the motor tends to increase and the efficiency also drops because more current flows into the motor winding than necessary, irrespective of the size of the load torque acting on the motor.

Thus, there was a need for further technological improvements.

OBJECT AND SUMMARY OF THE INVENTION

The present invention was arrived at in light of these matters, and it is an object thereof to solve the aforementioned problems by providing a control device of a position control motor for preventing step out of the position control motor, in which the heat generated by the position control motor is small and the energy efficiency is good.

A configuration of the present invention for achieving the above objectives is a device including a position detection portion detecting a motor rotor position of a motor for position control such as a brushless motor or a stepping motor, first and second control portions comparing a position detection signal from the position detection portion with a command position signal, and based on that positional deviation signal, outputting a signal corresponding to a current to be supplied to a winding of the motor, first and second distribution adjusting portions distributing the signals output from the first and second control portions with a set distribution ratio or distribution rate, a signal synthesis portion for synthesizing by vector addition the output signals distributed by the first and second distribution adjustment portions, and an amplification portion receiving the output signal synthesized by the signal synthesis portion and outputting the current to be supplied to the motor winding, wherein the position of the motor is controlled by the command position signal, and is as follows.

That is, it is a position control device of a position control motor, wherein when the position deviation signal is within an electrical angle of 90°, the first control portion outputs a sine wave data signal corresponding to the command position signal from a sine wave table, and when the position deviation signal exceeds an electrical angle of 90°, the first control portion outputs a sine wave data signal, from the sine wave table, that excites the motor such that the motor is at a stable excitation point at an electrical angle of 90° ahead of the rotor position, and wherein the second control portion serves as a servo control portion or a feedback control portion and outputs the output signal, and the amplification portion increases or decreases the current to be supplied to the motor winding in accordance with a load torque applied to the motor.

It is also a position control device of a position control motor wherein the first control portion is constituted by a command position counter, which counts the pulses of the command position signal, a rotor position counter, which counts the pulses of the position detection signal from the position detection portion, a phase calculation portion, which receives the pulse signals from both counters and outputs an address of the sine wave table based on a deviation signal between the two pulse signals, and the sine wave table for outputting a sine wave data signal in correspondence with the address signal from the phase calculation portion, wherein when the deviation signal is an electrical angle within 90°, the phase calculation portion outputs the command position pulse signal, and when the deviation signal is an electrical angle exceeding 90°, the phase calculation portion corrects the position detection pulse signal of the motor by an electrical angle of 90° and outputs that position detection pulse signal.

The present invention is configured as discussed above, and thus, as disclosed in Japanese Patent Provisional Publication No. 1999-113289, a command position signal and a position detection signal from the position detector linked to the motor rotor are input to the first control portion and the second control portion, which serves as a servo control portion or a feedback control portion, the outputs of the first and second control portions are set to first and second distribution adjusting portions, respectively, and the output of these two distribution adjusting sections are vector-synthesized (vector-added) by a signal synthesis portion, and current is supplied to the winding of the motor by the output amplification portion to drive the motor. The motor is driven being supplied with current that increases and decreases in accordance with a load that is mechanically applied to the motor.

It should be noted that the first control portion monitors the signal indicating the deviation between the command position signal and the rotor position signal that was detected, and for example, with the control portion illustrated in Japanese Patent Provisional Publication No. 1999-113289, two modes, an ST mode and a BL mode, such as those shown in FIG. 10, are provided depending on the amount of that deviation (electrical angle), and step down of the motor is prevented by switching to one of those modes.

Also, the second control portion is a servo control portion or a feedback control portion for an ordinary servo motor.

With the control device of a position control motor according to the present invention, the device is provided with a position detection portion detecting a motor rotor position of a motor for position control such as a brushless motor or a stepping motor, first and second control portions comparing a position detection signal from the position detection portion with a command position signal, and based on that positional deviation signal, outputting a signal corresponding to a current to supply to a winding of the motor, first and second distribution adjusting portions distributing the signals output from the first and second control portions with a set distribution ratio or distribution rate, a signal synthesis portion for synthesizing by vector addition the output signals distributed by the first and second distribution adjustment portions, and an amplification portion receiving the output signal synthesized by the signal synthesis portion and outputting the current to be supplied to the motor winding, wherein the position of the motor is controlled by the command position signal, and thus, the excellent effects that the motor generates little heat and the efficiency is good are achieved because step down of the motor is prevented and current is supplied in correspondence with the load.

Even if the control signal value from the first control portion is reduced to a signal value that corresponds to the above-mentioned motor windings current value by the first distribution adjusting portion, the servo control with the second control portion is increased and reduced in accordance with the load torque, and thus the problem of inadequate torque does not occur.

Also, since current is supplied to the motor windings according to the load applied to the motor, the energy efficiency is good and the generation of heat from the motor is reduced.

Furthermore, because the θ-T characteristics of the control with the first control portion can be used directly, there is no control delay and as such the responsiveness is good. If there is a load torque applied to the motor when the motor has stopped, the servo control with the second control portion is activated so as to make up for the θ-T characteristics of the motor, and thus the stopped position is adjusted so that it approaches the command position, increasing the accuracy of stop position.

DETAILED DESCRIPTION OF THE PREFERRED EMBODIMENTS

Preferred embodiments of the present invention are illustrated below in detail with reference to the drawings.

Figure 1:
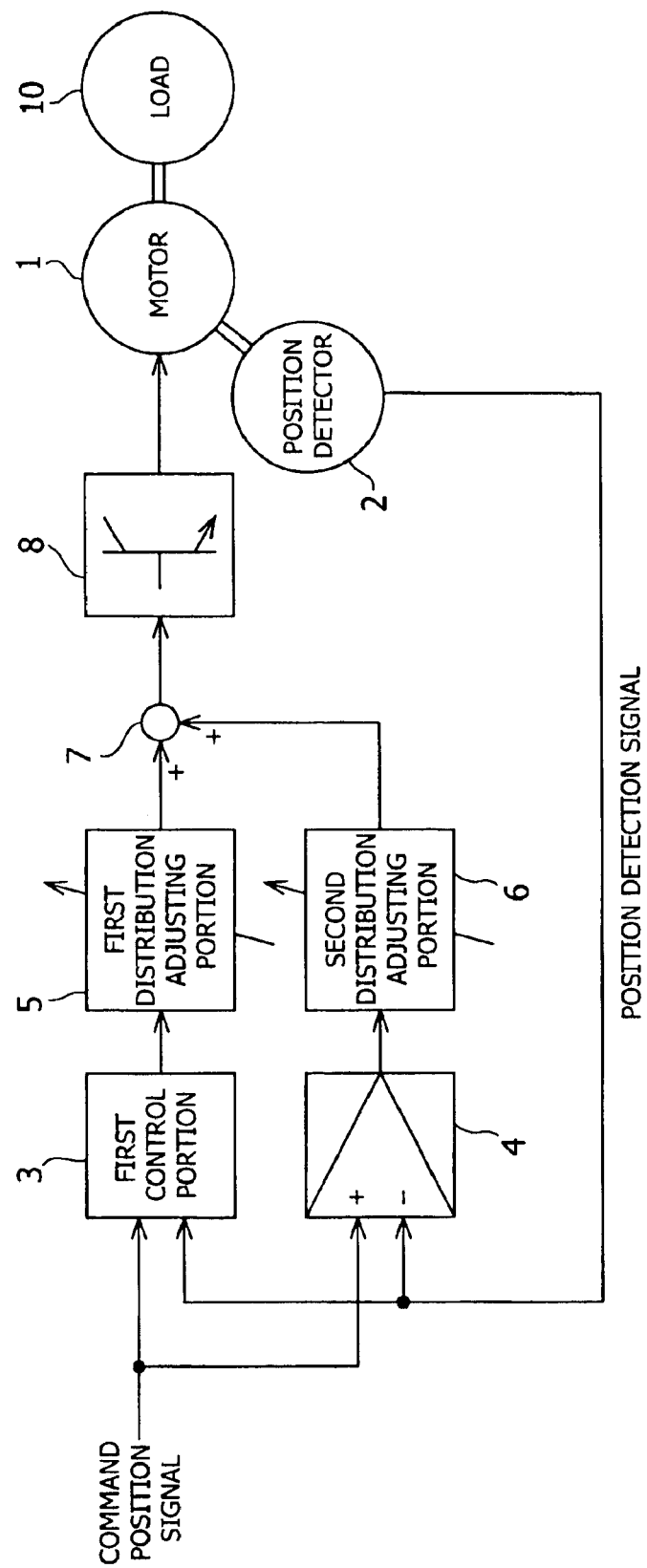
FIG. 1 is a block diagram showing a first embodiment of the control device of a position control motor according to the present invention.
Figure 2:
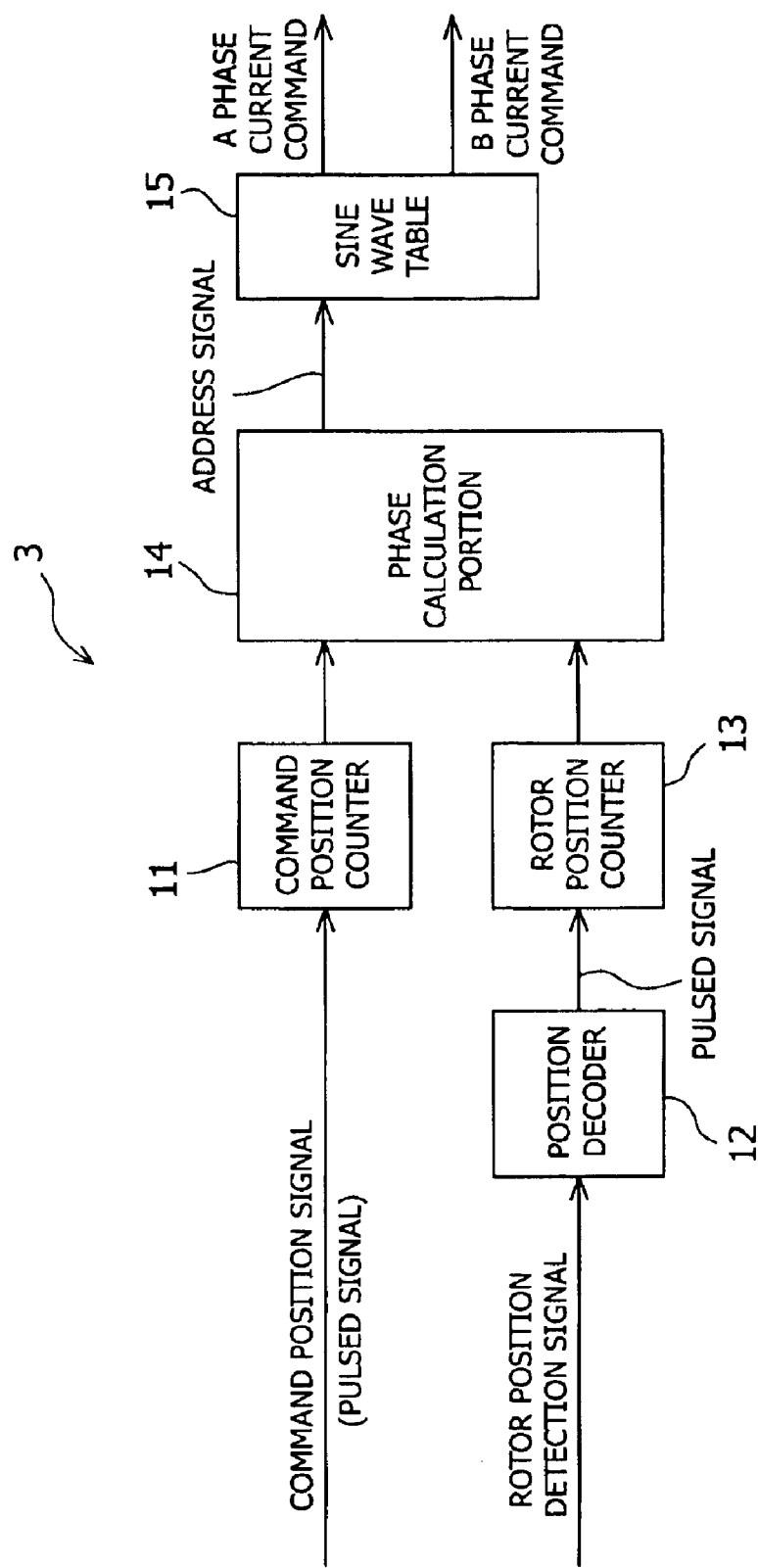
FIG. 2 is a block diagram showing an example of the interior of the first circuit portion of the control device.
Figure 3:
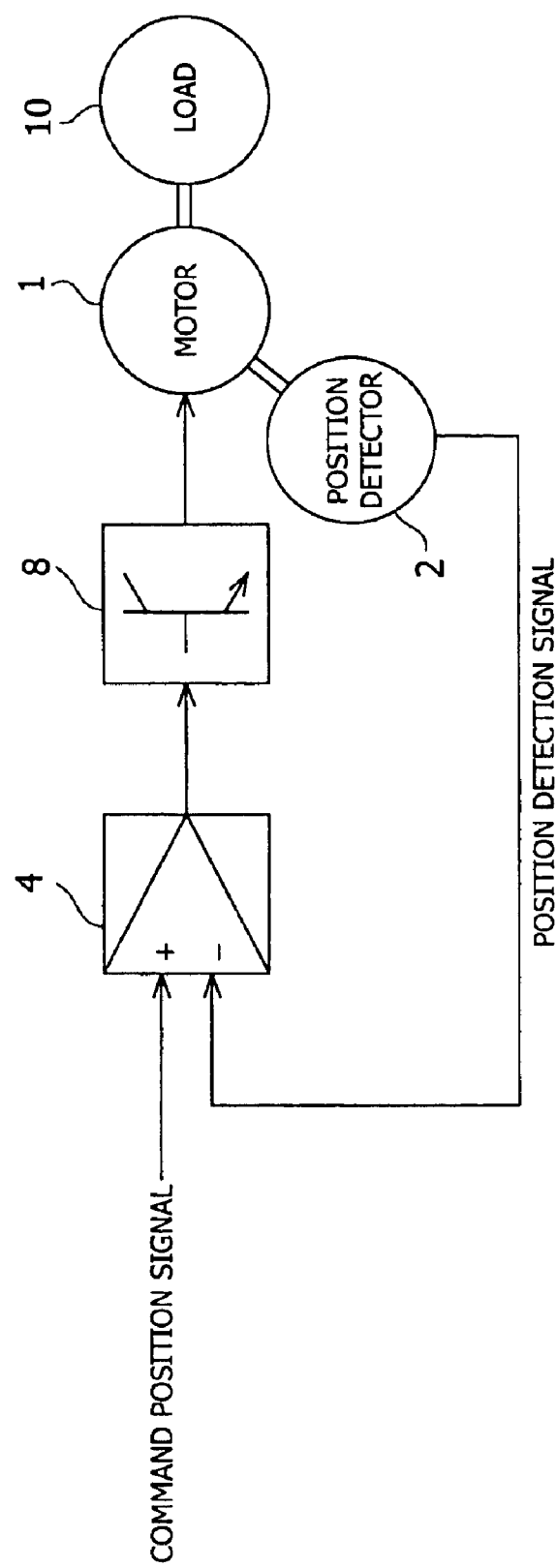
FIG. 3 is a block diagram of servo control with the second control portion of the control device.

FIG. 1 is a block diagram showing an embodiment of the control device of the position control motor according to the present invention, FIG. 2 is a block diagram showing an example of the inside of the first control portion of the control device, and FIG. 3 is a block diagram of the servo control portion of the second control portion of the control device.

In FIG. 1, reference numeral 1 denotes a two-phase hybrid stepping motor, in which 50 rotor teeth are formed on the outer circumferential surface of its rotor in opposition to stator teeth formed on the inner circumferential surface of the stator of the motor 1. A position detector 2 is linked to the rotor of the motor 1, and a position detection signal from the position detector 2 is input to first and second control portions 3 and 4 as a feedback quantity. A load 10 is mechanically applied to the motor 1.

The first and second control portions 3 and 4 both receive a command position signal from the outside, and in the first and second control portions 3 and 4, the position detection signal from the position detector 2 and the command position signal are compared, and based on this positional deviation, a signal corresponding to a current to be supplied to the windings of the motor 1 is output to first and second distribution adjusting portions 5 and 6. The first and second distribution adjusting portions 5 and 6 distribute the values of the output signals output from the first and second control portions 3 and 4, respectively, based on a distribution ratio or distribution rate set therein, and send the output signals to a synthesis portion 7. In the synthesis portion 7 the vectors of the output signals from the first and second distribution adjusting portions 5 and 6 are vector-synthesized (vector-added) and the result is sent to an output amplification portion 8. The output amplification portion 8 then outputs the current to be supplied to the windings of the motor 1.

The first control portion 3 shown in FIG. 2 compares a command position pulse signal, for example, serving as a command position signal that is input from the outside, and a rotor position pulse signal in which the signal from the position detector 2 of the rotor of the motor 1 has been converted to a pulse signal via a position decoder 12, performs calculations based on this position deviation, and outputs a signal corresponding to the current to be supplied to the windings (A-phase and/or B-phase windings) of the motor 1.

A 32-bit CPU (central processor unit) is used as the first control portion 3, and the output signal serving as the command for the current for the A-phase and/or B-phase windings of the motor 1 is updated in control cycles of 100 μs.

The inside of the first control portion 3 is described in greater detail using FIG. 2.

The first control portion is constituted by a command position counter 11 that counts the command position pulse signals, a rotor position counter 13 that counts the rotor position pulse signals obtained by converting the position detection signals from the position detector 2 with the position decoder 12, a phase calculation portion 14 that receives the pulse signals from the counters 11 and 13 and outputs an address signals of a sine wave table 15 based on the deviation between these two pulse signals, and the sine wave table 15 for outputting sine wave data signals in correspondence with the address signal from the phase calculation portion 14.

When the deviation between the pulse signals from the counters 11 and 13 is an electrical angle within 90°, the phase calculation portion 14 outputs an address signal based on the command position pulse signal and outputs a sine wave data signal corresponding to that address signal from the sine wave table 15 as the current command.

When the deviation is greater than an electrical angle of 90°, the phase calculation portion 14 corrects the phase of the position detection pulse signal of the motor 1 by an electrical angle of 90° and outputs an address signal based on the command position pulse signals, and outputs a sine wave data signal corresponding to that address signal from the sine wave table 15 as the current command.

With the phase calculation portion 14, the deviation between the command position and the rotor position is constantly monitored by subtracting the two count values, and the current phase to supply to the motor 1 is calculated from the value of the command position counter 11, the value of the rotor position counter 13, and the value of the deviation between these, and that current phase is output to the sine wave table 15 as the address signal.

Calculation of the current phase is performed basically through the following procedure.

When the deviation count value mentioned above is within a range of ±250 (electrical angle of ±90°; it should be noted that the range of an electrical angle of 360° corresponds to 1000 counts), the value of the command position counter 11 is directly output to the sine wave table 15 as the current phase.

When the deviation count value exceeds +250, a value obtained by adding 250 to the value of the rotor position counter 13 is output to the sine wave table 15 as the current phase. When the deviation count value exceeds −250, a value obtained by subtracting 250 from the value of the rotor position counter 13 is output to the sine wave table 15 as the current phase. In this case, this value is the same as the value obtained by adding 250 to the value of the rotor position counter 13, and inverting the current.

The second control portion 4 shown in FIG. 3 constitutes an ordinary servo-motor control portion. The second control portion 4 compares the command position signal from the outside and the detection signal from the position detector 2 linked to the rotor of the motor 1, and this positional deviation is amplified by the output amplification portion 8 and current is supplied to the motor 1 windings, driving the motor 1. Such control is known as feedback control or servo control, and through this control system the motor 1 is set to the command position with a current that is in equilibrium with the load 10, which has been mechanically applied to the motor 1.

The operation of the control device for the above position control is described next for a case where the motor 1 is a stepping motor.

First, in the stepping motor, a plurality (in this embodiment, 50) of stator teeth and rotor teeth are formed in the opposing surfaces of the stator and the rotor, respectively, and the opposing teeth are attracted to or repelled due to the respective magnetic flux, generating torque that causes the rotor to rotate.

Figure 4:
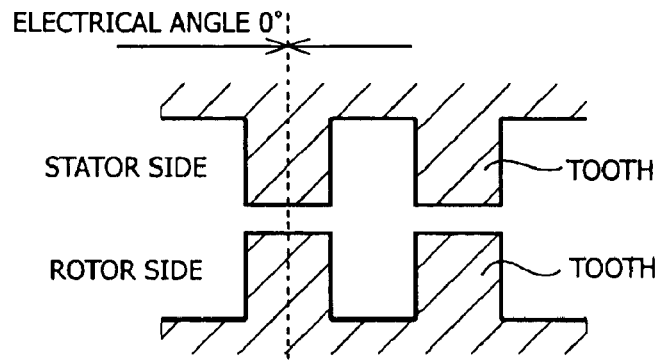
FIG. 4 is a diagram showing a case in which the positional relationship (phase) between the stator teeth and the rotor teeth of the stepping motor is an electrical angle of 0°.
Figure 5:
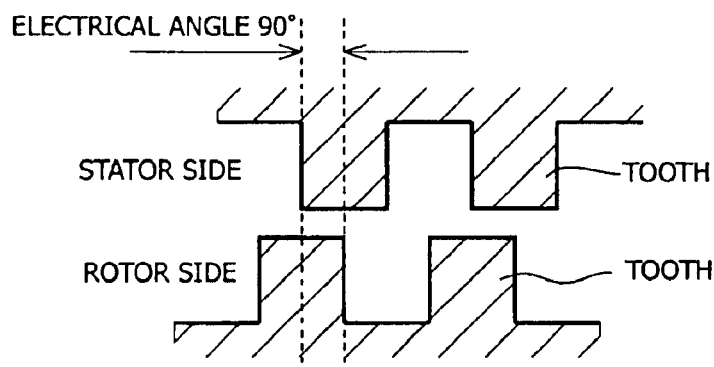
FIG. 5 is a diagram showing a case in which the positional relationship (phase) between the stator teeth and the rotor teeth of the stepping motor is an electrical angle of 90°.

As shown in FIG. 4, if the positional relationship (phase) between the stator teeth and the rotor teeth is an electrical angle of 0°, then no torque is generated by the magnetic flux. As shown in FIG. 5, if the positional relationship between the stator teeth and the rotor teeth is an electrical angle of 90°, then torque is generated magnetically. Also, under identical conditions regarding the current of the stator windings, when the phase is 90°, a maximum torque is generated, whereas when the phase is −90°, a maximum torque is generated in the direction opposite that when the phase is 90° (negative direction).

Application of servo control to stepping motors is accomplished by a similar method as for synchronized AC motors.

As mentioned above, the best efficiency is attained when the excitation angle of the current that flows into the stator windings is an electrical angle of −90° or +90°, and thus the excitation angle is set to 90° or −90°. The size of the current changes depending on the command signal and the feedback control from the position detector 2.

Figure 6:
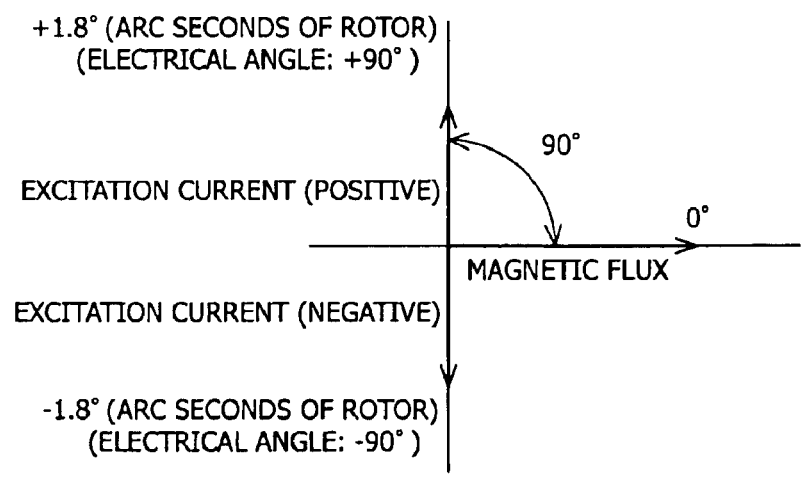
FIG. 6 is a vector diagram of the motor current when servo control is performed by the second control portion, and indicates the current components in only the vertical axis direction (90°) with respect to the horizontal axis direction (magnetic flux vector).

In this case, as shown in FIG. 6, in servo control there is a current component in only the vertical axis direction (90°). In FIG. 6, the position of the rotor is expressed by the rotor magnetic flux. If such control is performed, the torque that is generated becomes large is proportion to the size of the excitation current. In the case of feedback control, the current is adjusted by controlling it in accordance with the load torque, and the energy efficiency is good.

Figure 7:
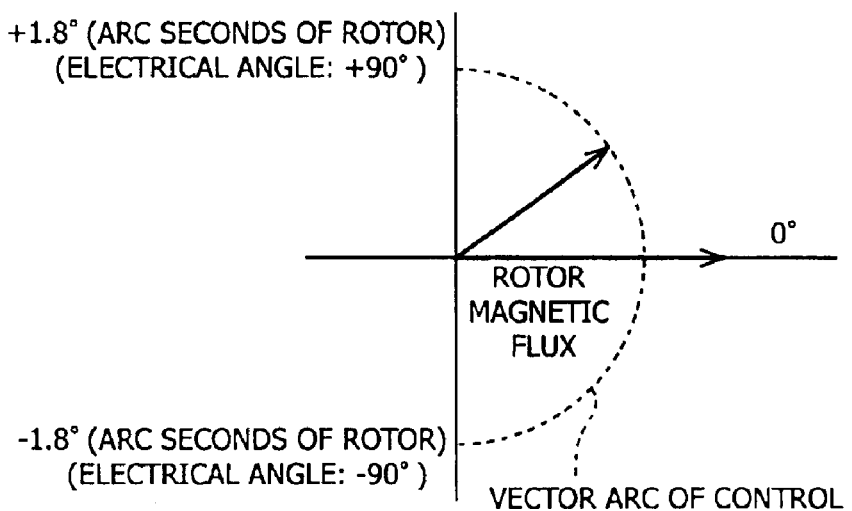
FIG. 7 is a vector diagram of the motor current when control is performed by the first control portion, and shows the path traced by the current vector with respect to the horizontal direction (magnetic flux vector) in a dashed line.

Viewing the method of control with the first control portion 3 of FIG. 2 from the perspective of the rotor, the size of the excitation current is constant, whereas the excitation angle changes depending on the applied load torque, and set within a range of ±90°. Thus, as shown in FIG. 7, the path traced by the excitation current is a semicircle. Torque is not generated in the direction of the horizontal axis in FIG. 7 but is generated with components in the vertical axis direction, and thus no torque is generated near 0° and a positive and negative maximum torque are generated at ±90° respectively.

Figure 8:
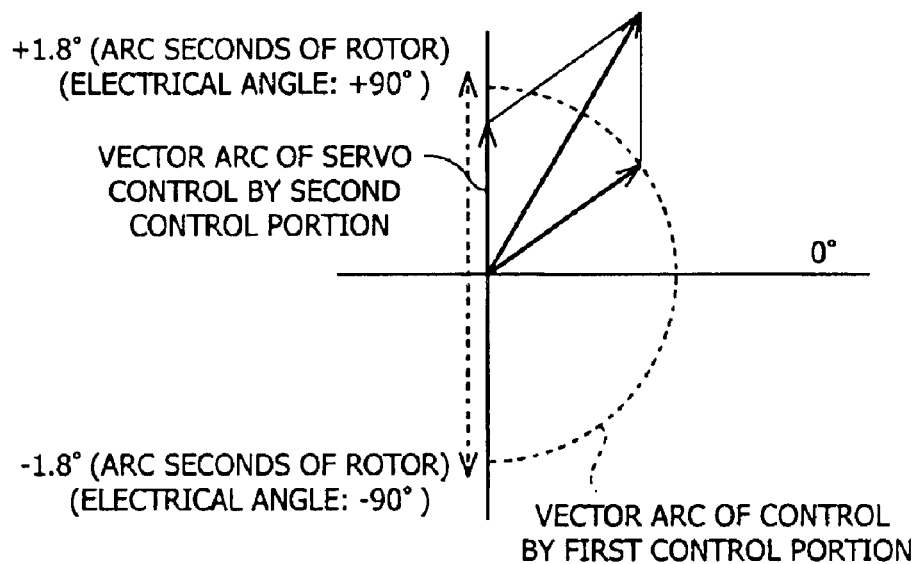
FIG. 8 is a diagram showing a composite vector made of the vector of the motor current when control is performed buy the first control portion and the vector of the motor current when servo control is performed by the second control portion.
Figure 9:
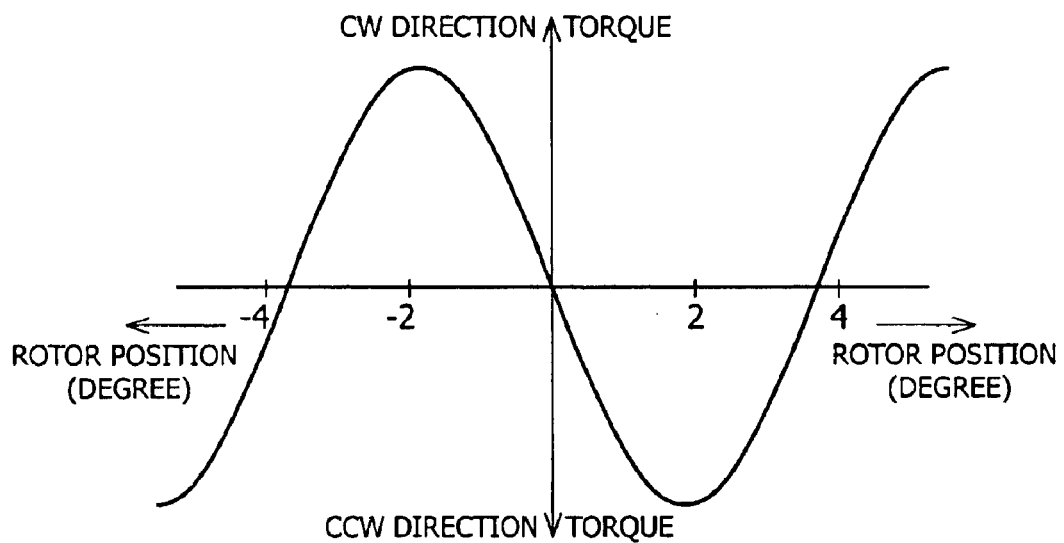
FIG. 9 is a θ-T property diagram showing the relationship between the generated torque (vertical axis) and the rotation angle (horizontal axis) of the rotor of the stepping motor.
Figure 10:
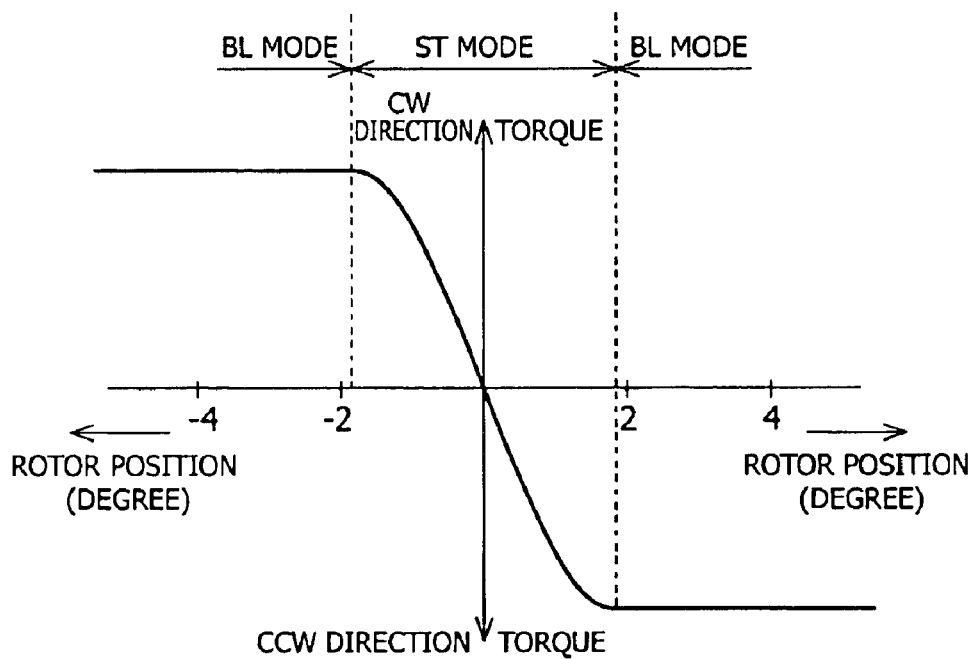
FIG. 10 is a θ-T property diagram showing the relationship between the generated torque (vertical axis) and the rotation angle (horizontal axis) of the motor rotor when a control mean has been added to a stepping motor having the θ-T characteristics shown in FIG. 9 according to a conventional technology (Japanese Patent Provisional Publication No. 1999-113289).

FIG. 8 shows how the excitation currents of the control with the first control portion 3 and the servo control with the second control portion 4 are synthesized by vector addition.

Also, the signal value of the control with the first control portion 3 (current value) and the signal value of the servo control with the second control portion 4 (current value) change depending on the load, but the maximum signal value (current value) of the two that can be used can be set to any distribution ratio or distribution rate by the first and second distribution adjusting portions 5 and 6.

For example, if the signal value corresponding to the current capable of generating a maximum torque of the motor 1 to be controlled is regarded as 100%, then they may be distributed such that the control with the first control portion 3 and the servo control with the second control portion 4 each account for a current of 50%. In this case, the signal for the control with the first control portion 3 is supplied such that it always corresponds to a current of 50%, and the signal for the servo control with the second control portion 4 is supplied such that it corresponds to a current of 0 to 50%, depending on the load.

Thus, if the control with the first control portion 3 and the servo control with the second control portion 4 are synthesized, then the motor 1 is driven at a winding current of 50% to 100%.

Energy Efficiency

A case in which the torque distribution between the control with the first control portion 3 and the servo control with the second control portion 4 is adjusted to a distribution of 50%:50% by the first and second distribution adjusting portions 5 and 6 is described as a working example of the present embodiment.

If a torque of 70% of the maximum torque is required due to the load inertia when accelerating or decelerating during driving of the motor 1, then the control with the first control portion 3 always corresponds to the output of a current value of 50%, but this alone does not result in sufficient torque. In this case, the servo control (feedback control) by the second control portion 4 is activated and makes up for the insufficient torque amount with an output of a current value of 20%, thus yielding a torque that corresponds to the load inertia. Also, when the speed is constant, load torque due to load inertia is not generated so that in this case the motor 1 is driven with only the output of the current value of the control with the first control portion 3.

If only the control with the third control portion 3 is employed, then a current larger than the maximum load when driving the motor (70%) is constantly supplied to the motor 1. Thus, by performing control with both the third and fourth control portions rather than with the first control portion 3 alone, less current supplied ion total, and this improves the energy efficiency.

Responsiveness

With the servo control with the second control portion 4, the positional deviation between the command position signal and the position detection signal is amplified by the second control portion 4 and by passing through the output amplification portion 8 and is supplied to the windings of the motor 1 as current, but a control delay occurs at this time. With the control with the first control portion 3, the θ-T characteristics of the motor 1 can be adopted directly and thus there is no control delay. The result is that the control signal obtained by synthesizing the signals output from both control portions 3 and 4 with the synthesis portion 7 and output therefrom has better responsiveness than in the case of using only servo control with the second control portion.

Stopping Accuracy

The stepping motor 1 generates torque due to its θ-T characteristics. Thus, if load torque is applied when the motor is stopped, the angle of the rotor is shifted and a torque corresponding to the load is generated. On the other hand, with the servo control with the second control portion 4, the control portion 4 adjusts the torque such that the detection position of the rotor approaches the command position. Thus, the stopping position is shifted due to the load fluctuation but is adjusted by the control.

In the case of control with the first control portion 3 only, torque cannot be generated unless the rotor angle is shifted, but in the case of servo control with the second control portion 4, it is possible to generate torque even if the rotor angle is not shifted with respect to the command position. Thus, if there is a load torque while the motor is stopped, the stopping position is adjusted by the servo control of the second control portion 4, increasing the accuracy of the stopping position.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A position control device of a position control motor, comprising:

a position detection portion detecting a motor rotor position of a motor for position control, such as a brushless motor or a stepping motor;

first and second control portions comparing a position detection signal from the position detection portion and a command position signal, and based on that positional deviation signal, outputting a signal corresponding to a current to be supplied to a winding of the motor;

first and second distribution adjusting portions distributing the signals output from the first and second control portions with a set distribution ratio or distribution rate;

a signal synthesis portion for synthesizing by vector addition the vectors of the output signals distributed by the first and second distribution adjustment portions; and an amplification portion for receiving the output signal synthesized by the signal synthesis portion and outputting the current to be supplied to the motor winding;

wherein the position of the motor is controlled by the command position signal;

wherein when the position deviation signal is within an electrical angle of 90°, the first control portion outputs a sine wave data signal corresponding to the command position signal from a sine wave table, and when the position deviation signal exceeds an electrical angle of 90°, the first control portion outputs a sine wave data signal, from the sine wave table, that excites the motor such that the motor is at a stable excitation point at an electrical angle of 90° ahead of the rotor position; and wherein the second control portion serves as a servo control portion or a feedback control portion and outputs the output signal, and the amplification portion increases or decreases the current to be supplied to the motor winding in accordance with a load torque applied to the motor.

2. The position control device of a position control motor according to claim 1, wherein the first control portion comprises:

a command position counter, which counts the pulses of the command position signal;

a rotor position counter, which counts the pulses of the position detection signal from the position detection portion;

a phase calculation portion, which receives the pulse signals from both counters and outputs an address of the sine wave table based on a deviation signal between the two pulse signals; and the sine wave table for outputting a sine wave data signal in correspondence to the address signal from the phase calculation portion;

wherein when the deviation signal is an electrical angle within 90°, the phase calculation portion outputs the command position pulse signal, and when the deviation signal is an electrical angle exceeding 90°, the phase calculation portion outputs corrects the position detection pulse signal of the motor by an electrical angle of 90° and outputs that position detection pulse signal.

* * * * *